United States Patent
Perrone, II et al.

(10) Patent No.: US 9,178,883 B2
(45) Date of Patent: Nov. 3, 2015

(54) LEVERAGING ONLINE IDENTITIES TO GRANT ACCESS TO PRIVATE NETWORKS

(71) Applicant: SocialSign.in, Inc., Greenwich, CT (US)

(72) Inventors: Michael Edward Perrone, II, Cos Cob, CT (US); Jeff Bryan Lanza, San Francisco, CA (US); Joseph Anthony Indriolo, Briarcliff Manor, NY (US)

(73) Assignee: SocialSign.In, Inc., Greenwich, CT (US)

( * ) Notice: Subject to any disclaimer, the term of this patent is extended or adjusted under 35 U.S.C. 154(b) by 0 days.

(21) Appl. No.: 14/103,732

(22) Filed: Dec. 11, 2013

(65) Prior Publication Data

US 2014/0165178 A1 Jun. 12, 2014

Related U.S. Application Data

(60) Provisional application No. 61/736,485, filed on Dec. 12, 2012.

(51) Int. Cl.
*H04L 29/06* (2006.01)
(52) U.S. Cl.
CPC .................. *H04L 63/0892* (2013.01)
(58) Field of Classification Search
USPC .......................................................... 726/9
See application file for complete search history.

(56) References Cited

U.S. PATENT DOCUMENTS

| | | | |
|---|---|---|---|
| 7,924,780 B2 | 4/2011 | Waisman-Diamond | |
| 7,995,993 B1 | 8/2011 | Varsavsky Waisman-Diamond | |
| 8,126,430 B2 | 2/2012 | Varsavsky Waisman-Diamond | |
| 8,306,502 B2 | 11/2012 | Varsavsky Waisman-Diamond | |
| 8,897,344 B2* | 11/2014 | Maguire | 375/219 |
| 2012/0307875 A1* | 12/2012 | Maguire | 375/219 |
| 2013/0198274 A1* | 8/2013 | Papakipos et al. | 709/204 |
| 2013/0198383 A1* | 8/2013 | Tseng et al. | 709/225 |
| 2015/0003333 A1* | 1/2015 | Maguire | 370/328 |

OTHER PUBLICATIONS

Authentication protocols for ad hoc networks|https://www.google.com/url?paf=&q=https://svn-crypto.elen.ucl.ac.be/crypto/services/download/publications.pdf.8ff26a882132a0a6.7064663236392e706466.pdf&usg=AFQjCNEH2d9X5OGbrtE742RftHy3GO8Ptw| Aboudagga et al.|2005|pp. 1-9.*

* cited by examiner

*Primary Examiner* — Mahfuzur Rahman
(74) *Attorney, Agent, or Firm* — Lowenstein Sandler LLP

(57) ABSTRACT

An authentication service running on a processing device receives a request from a local area network (LAN) to authenticate a computing device (and/or a user of the computing device) that has attempted to access the LAN, the request comprising a first identifier (ID) that uniquely identifies the computing device. The authentication service determines whether to authenticate the computing device based on the first ID, information from a third party data set, and an authentication criterion of the LAN. Responsive to determining that the information from the third party data set satisfies the authentication criterion, the authentication service notifies the LAN that the computing device is authenticated.

23 Claims, 6 Drawing Sheets

LEVERAGING ONLINE IDENTITIES TO GRANT ACCESS TO PRIVATE NETWORKS

RELATED APPLICATIONS

This patent application claims the benefit under 35 U.S.C. §119(e) of U.S. Provisional Application No. 61/736,485, filed Dec. 12, 2012, which is herein incorporated by reference.

BACKGROUND

Traditionally, when a user wishes to connect his or her mobile device (e.g., laptop computer) to a Wi-Fi hotspot, that user is directed to a portal page of a captive portal for the Wi-Fi hotspot. The portal page may request agreement to terms of use and/or request login information. The user agrees to the terms of use and/or provides a password, after which the mobile device is granted access to the Internet. For traditional systems, this process is performed each time the computing device attempts to access the Wi-Fi hotspot.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Described herein is an authentication service that is capable of authenticating computing devices for multiple private networks. Computing devices may attempt to gain access to a private network, which may be a wireless network such as a Wi-Fi network. A network device (e.g., a router) of the private network may delegate authentication to the authentication service. Accordingly, responsive to an access attempt by a computing device, the network device may send an authentication request to the authentication service. The authentication service may then determine whether to authenticate the computing device by leveraging one or more third party data sets, such as provided by social network services. For example, the authentication service may determine whether an online identity associated with the computing device satisfies an authentication criterion designated for the private network. The authentication service then notifies the private network that the computing device is or is not authenticated.

Embodiments presented herein simplify the process of negotiating access to a private network such as a Wi-Fi network. The authentication service described in embodiments is capable of providing on-the-fly authentication of users and their devices using third party data sets from third party sources. Notably, authentication of a user and/or a device of a user can be calculated dynamically without an administrator or system associated with the private network having previously granted access to that user or user device, without the administrator or system having provisioned an account or identity for the user or user device, and without the private network having any previous knowledge of the user or user device. Embodiments provide the ability to bind a user identity to a user's computing device, and then access that identity from that computing device for easy, quick access to different Wi-Fi networks at different locations. Once a user's identity has been tied to his computing device and he has satisfied an authentication criterion for a set of Wi-Fi networks, that computing device may automatically be authenticated by any of those Wi-Fi networks with little or no user interaction. The configuration of user authentication for access permissions allows for an easy way to manage access to networks by leveraging existing online data relationships. Additionally, users may be provided with a tailored experience based on knowledge of user identity, which allows for experiences in the digital domain that are on par with physical experiences at a given location.

Figure 1:
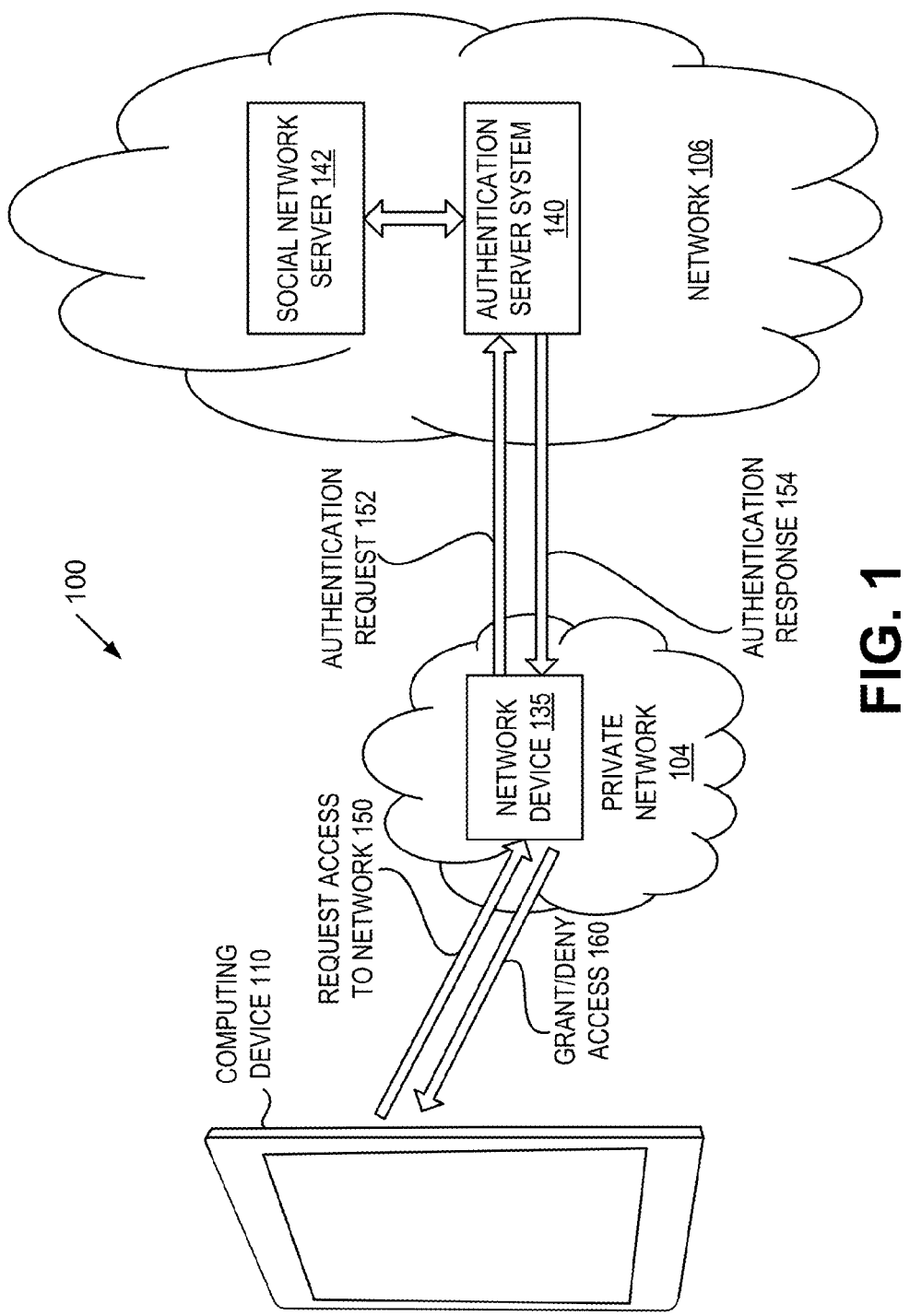
FIG. 1 is a pictorial representation of an authentication service provided to private networks.

FIG. 1 is a pictorial representation of an authentication service 100 provided to a private network 104. A computing device 110 detects and attempts to gain access to private network 104. The computing device 110 may include any type of portable computing device such as a tablet computer (as shown), electronic book reader, portable digital assistant, mobile phone, laptop computer, tablet computer, camera, video camera, netbook, notebook, and the like. The computing device 110 may also be a device with a minimal or no user interface, such as wearable smart device (e.g., a digital watch, bracelet, glasses, shoes, belt, etc.) with a wireless network interface controller (NIC).

Private network 104 may be a local area network (LAN) or wide area network (WAN). Private network 104 may include a wireless network such as a Bluetooth network, a Zigbee network or a Wi-Fi network. Private network 104 may alternatively or additionally include a wireless carrier system that can be implemented using various data processing equipment, communication towers, etc. Such a wireless carrier system may use long term evolution (LTE), worldwide interoperability for microwave access (WiMAX), global system for mobile communication (GSM), code division multiple access (CDMA), wideband code division multiple access (WCDMA), time division multiple access (TDMA), universal mobile telecommunications system (UMTS), or other wireless telephony communication standards.

The private network 104 may include one or more network devices (e.g., network device 135), which may include gateways, switches, routers, access points, and so on. Network device 135 may be configured to delegate authentication of computing devices to an authentication service provided by authentication server system 140.

When computing device 110 comes into range of private network 104, computing device 110 may send a request 150 to access the private network 104. This received request 150 may include a media access control (MAC) address of the computing device 110 and/or an alternative identifier associated with the computing device 110. Examples of alternative identifiers (IDs) include cookies, certificates or other IDs that may have been assigned to the computing device 101 by authentication server system 140.

Network device 135 may then send an authentication request 152 to authentication server 140 rather than authenticating the computing device 110 locally. The authentication request may include the MAC address or other unique identifier of the computing device. The authentication request may additionally include a second MAC address and/or other identifier of the network device 135. Examples of other identifiers that the network device 135 may be associated with include a cookie, certificate, service set identifier (SSID), and so forth. In one embodiment, the network device redirects the computing device to a web page of the authentication server system 140.

Authentication server system 140 may include one or more machines (e.g., one or more server computers, routers, gateways, etc.) that have processing and storage capabilities to provide server-based functionality. Authentication server system 140 may be implemented by a single machine or a cluster of machines, each of which may include data stores and/or other data processing equipment. In one embodiment, the authentication server system 140 includes one or more network based servers, which may be hosted, for example, by network based hosting services such as Amazon's® Elastic Compute Cloud® (EC2).

Authentication server system 140 maintains user accounts, each of which is associated with one or more computing devices. Each user account may bond one or more computing devices to one or more online identities of a user. Authentication server system 140 additionally maintains network accounts, each of which may be associated with one or more private networks. Each network account may include one or more authentication policies, each of which may provide one or more authentication criteria.

Authentication server system 140 receives the authentication request including the unique identifier of the computing device 110 and the unique identifier of the network device 135. Authentication server system 140 determines whether the computing device 110 is associated with any existing user accounts based on comparing the unique identifier of the computing device 110 to unique identifiers included in user accounts. If no match is found, authentication server system 140 may send a message to the computing device (via network device 135) prompting a user of the computing device to set up an account. If a match is found, the authentication server system 140 determines whether information from a third party data set (e.g., information associated with an online identity) satisfies one or more authentication criteria of the private network 104. Authentication server system 140 may identify the authentication criteria by finding a network account having a unique identifier that matches the received unique identifier of the network device 135.

In one embodiment, the third party data set includes profile information from a social network account of a user of the computing device 110. Such profile information may be referred to as an online identity. The third party data set may be associated with the user account, and may have been obtained from social network server 142. In one embodiment, the authentication server 140 maintains a session with the social network server 142 for the social network account associated with the user account. The authentication server 140 may periodically or continuously receive status updates for the social network account of the user of the computing device 110 via the maintained session. Examples of social network services with which sessions may be maintained include LinkedIn®, Facebook®, Google+®, Myspace®, Pinterest®, Twitter®, and so on. Note that other types of third party sets that are not from social network services may also be used for authentication purposes, such as association membership lists (e.g., for professional associations, business groups, Yahoo® groups, etc.), which may be provided by servers associated with the associations.

If the data from the third party data set satisfies the authentication criteria, then authentication server system 140 determines that the computing device 110 should be authenticated. Examples of authentication criteria include relationship status between the social network account of the user and a separate social network account associated with the private network 104. For example, if the private network is the home network of an individual who has a Facebook® account, then the authentication criteria may be satisfied if the social network account of the user of computing device 110 has a "friends" relationship status with the social network account of the individual who owns the private network 104. Alternatively, if the private network is provided by a business, then the authentication criteria may be satisfied if the social network account of the user of computing device 110 has a "like" relationship status with the social network account of the business that provides the private network 104.

Once the authentication server system 140 has made an authentication decision for the computing device 110, authentication server system 140 sends an authentication response 154 to network device. If that authentication response 154 indicates that the computing device is authenticated, then the network device 135 grants 160 access for the computing device 110 to the private network 104 (and thus to the Internet). If the authentication response 154 indicates that the computing device is not authenticated, then private network 104 may deny 160 access to the private network 104. In the case of a "deny" authentication response, authentication server system 140 may additionally prompt the computing device 110 to perform an action that will cause the user account associated with the computing device to satisfy the authentication criteria. For example, if the authentication criterion requires that the computing device be associated with a particular social network account (e.g., a Facebook account) that has a "like" relationship to a business, then authentication server system 140 may prompt the user of computing device 110 if they want to "like" the business. Alternatively, if the user account is not tied to a social network account of the particular social network service, then authentication server system 140 may prompt the user to provide credentials and authorization to establish a session with a particular social network account of the social network service.

Figure 2:
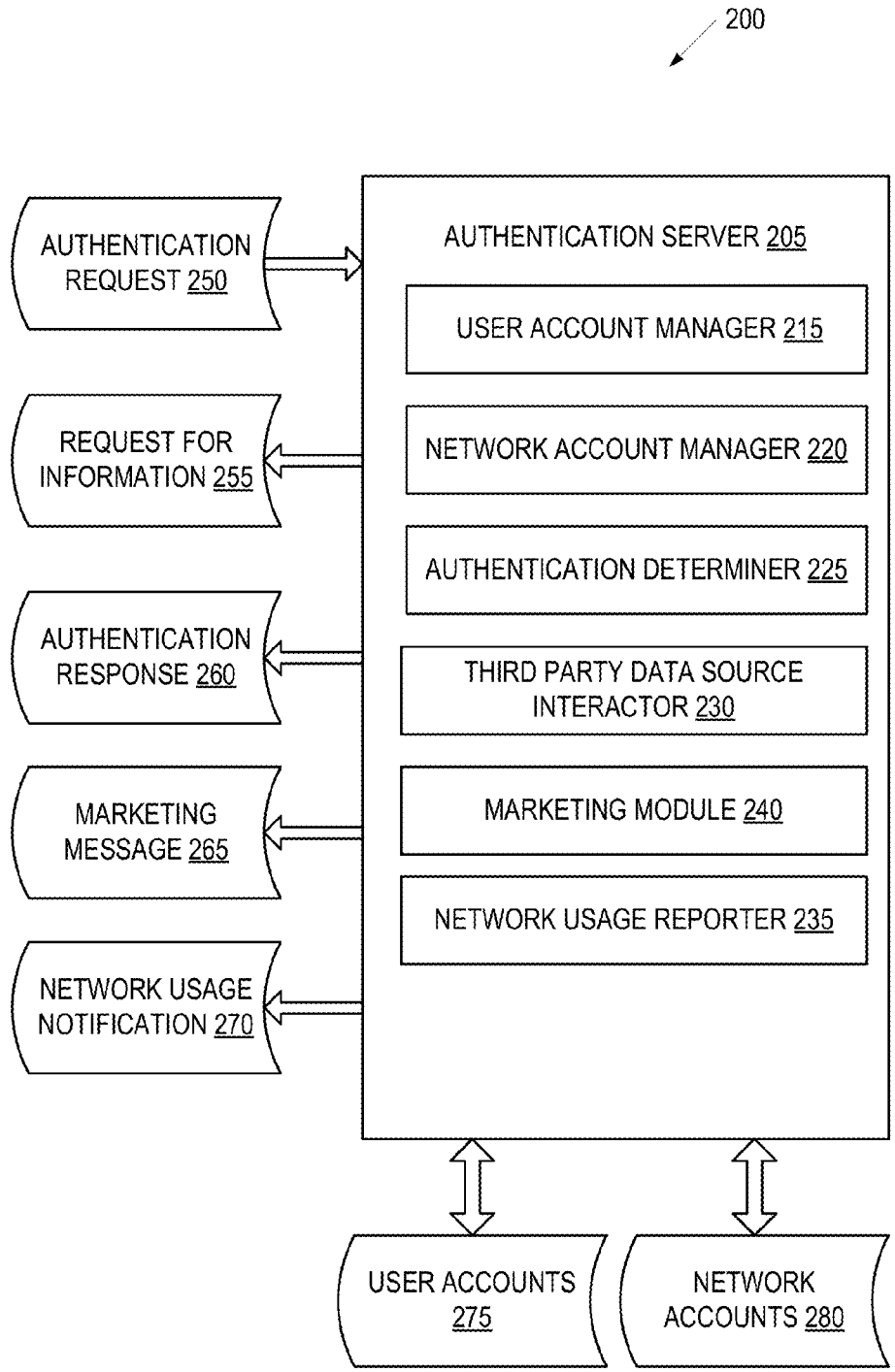
FIG. 2 is a block diagram of one embodiment of an authentication server.

FIG. 2 is a block diagram of one embodiment of an authentication server 205. The authentication server 205 may be a server of authentication server system 140 of FIG. 1. In one embodiment, authentication server 205 includes a user account manager 215, a network account manager 220, an authentication determiner 225, a third party data source interactor 230, a network usage reporter 235, and a marketing module 240. The functionality of one or more of the user account manager 215, network account manager 220, authentication determiner 225, third party data source interactor 230, network usage reporter 235, and marketing module 240 may be combined into a single module or may be divided into further modules.

Network account manager 220 generates and manages network accounts 280. An individual or business may sign up for a network account with network account manager 220. To obtain a network account, the individual or business provides a unique identifier such as a MAC address of an access point, router or other network device to authentication server 205. The individual or business may also select one or more authentication policies or rules. Network account manager 220 then generates a new network account that includes the unique identifier and the authentication policies. An additional unique identifier such as a certificate or unique value (e.g., which may be stored in a cookie) may also be generated by network account manager 215 and assigned to a network account. If such a unique identifier is used, that unique identifier may be downloaded to the network device.

To enable a private network to use the authentication service provided by authentication server 205, a network device on the private network may be configured to refer to authentication server 205 to make the authentication determination. For example, the hook of the network device that normally might be configured to perform remote authentication dial in user service (RADIUS) authentication or Active Directory authentication may be configured to delegate authentication to the authentication server 205. Additionally, the network device may be configured to enable access of an unauthenticated computing device to the authentication server and/or to certain social network services.

In one embodiment, network accounts 280 are bonded to one or more social network accounts of the individual or business associated with the network account. In such an embodiment, third party data source interactor 230 may establish a session with those social network accounts based on input from the network account holder. This session may be a long lived session that is maintained indefinitely or for a particular period. For example, some sessions may be maintained between the authentication server 205 and a social network account for 60 or 90 days. After the 60 or 90 day period lapses, the individual or business may be prompted to provide credentials for the social network account to renew or reestablish the session.

A particular network account may include multiple different private networks and/or network devices. Each private network may include different authentication policies. Some or all of the private networks in a network account may also share the same authentication policies. In one embodiment, a single access point may be associated with multiple different private networks (e.g., may have multiple different SSIDs). The different private networks provided by a single access point may be distinguished based on a unique identifier of the access point and an SSID for the private networks. Each of the different private networks provided by the access point may have separate authentication policies. For example, a business may provide a general network and a separate premium network that is provided to most valued customers. There may be separate authentication rules that are applied to determine whether a computing device belongs to a most valued customer, and thus to determine whether to grant access to the premium network. In such an example, the premium network may have a higher bandwidth, fewer use restrictions, or other advantages over the general network.

Numerous different types of authentication policies may be used. Many of the available authentication policies depend on a third party data set. One useful type of third party data set is profile information of a social network account from a social network service. A simple authentication policy that uses data from a social network account may authenticate a computing device if that computing device is associated with a user account that has an active session with a social network account from a particular social network service. For example, a first authentication policy might authenticate a computing device if it is tied to a user account that includes a session to a Facebook account (e.g., that includes a Facebook online identity). Another authentication policy might authenticate a computing device if it is tied to a user account that includes a session to a LinkedIn account (e.g., that includes a LinkedIn online identity). Yet another authentication policy might authenticate a computing device if it is tied to a user account that includes a session to a Google+ account (e.g., that includes a Google+ online identity).

Some network accounts might include authentication policies that provide multiple different ways to authenticate. For example, a network account may include authentication policies that specify that a computing device is to be authenticated if it is associated with a user account that is tied to any of a LinkedIn account, a Facebook account, a MySpace account, a Twitter account, or a Pinterest account.

Some network accounts include more restrictive authentication policies. One example restrictive authentication policy may require that a user account be associated with a social network account of a user that has a particular relationship with another social network account. For example, a business might have a Facebook account, and an authentication policy used by that business for its private networks might specify that computing devices are to be authenticated if they are associated with an online Facebook identity that "likes" the business' Facebook account. In another example, a business might have a Yelp® account, and their network account with the authentication server 205 may include a policy that authenticates a user's computing device if that user has posted a review of the business on Yelp. In another example, an authentication policy may specify that the authentication server 205 is to authenticate a user's computing device if that user has a LinkedIn account, for example, with at least a threshold number of contacts. In still another example, an authentication policy may specify that the authentication server 205 is to authenticate a user's computing device if that user has a LinkedIn account with at least a threshold number of shared contacts with a LinkedIn account associated with the private network.

In another example, a homeowner may have a private home network. That homeowner may set up a network account having an authentication policy that will authenticate computing devices of the homeowner's friends. In such an instance, a computing device may be identified as belonging to a friend of the homeowner (and thus be authenticated) if a social network account associated with that computing device has a friend status with the social network account of the homeowner and/or if the social network account indicates that the user of the computing device is a friend of a friend of the homeowner. Many other authentication policies may be set up based on profile information (e.g., social network graph relationships) from social network services and/or based on other third party data sets.

Network accounts may additionally include marketing policies that specify marketing actions to perform with respect to users of private networks. Marketing policies may specify circumstances under which coupons or special offers are to be sent to computing devices of users visiting a private network. Other types of marketing actions include sending a request to perform an action with respect to a social network account associated with a private network (e.g., a request to become a fan of a business on Facebook), sending an offer to download an application, sending a request for information, sending a request to sign up to a mailing list, and so forth. Specific actions to be taken may be based on known information about the user that is being marketed to. For example, a marketing policy might specify to deliver a coupon for a first category of goods if a user is a woman and a coupon for a second category of goods if a user is a man. Many other types of marketing policies may be used that depend on user information.

User account manager 215 generates and manages user accounts 275. Each user account includes unique identifiers of one or more computing devices of a user as well as gathered information about that user. A unique identifier may be a MAC address of a computing device. A unique identifier may also be a certificate or unique value (e.g., which may be stored in a cookie) that may be generated by user account manager 215 and assigned to a user account. If such a unique identifier is used, that unique identifier may be downloaded to the user device. Gathered information may include a name, home address, travel history, shopping preferences, likes and dislikes, profile information of one or more online identities, and so on.

A user account may additionally include one or more forms of identity validation information. Examples of identity validation information include biometric data (e.g., a voice imprint, a fingerprint, a retina scan, etc.), a personal identification number (PIN), a password, and a gesture pattern. The identity validation information may be used to verify that a computing device is being used by a particular user. For example, if a particular computing device has multiple users, then the identity validation information may be used to distinguish between those users and select the proper user account for a computing device at a given time.

User accounts may be generated and/or updated responsive to a computing device attempting to access a private network. Additionally or alternatively, user accounts may be set up and/or modified by users before such activity. For example, a user may visit a web page provided by user account manager 215 for establishing and/or editing user accounts. In such an embodiment, a user may input a MAC address or other unique ID of a computing device to add to a user account. This may enable computing devices with limited user interfaces to be added to a user account.

Many authentication policies of network accounts may specify authentication criteria that are based on third party data sets such as those of social network accounts. Accordingly, a user account may be associated with social network accounts (online identities) of one or more social network services. A user may be asked to provide authorization for the authentication server 205 to establish a session with a particular social network account of the user on a social network service. The authentication server 205 may then maintain that session between the authentication server 205 and the social network account indefinitely or for a period of time (e.g., 60 or 90 days). Authentication server 205 may then receive periodic updates from the social network service regarding the social network account. This updated profile information may be used to automatically determine whether a user account satisfies an authentication policy of a network account. Thus, the third party data set may be used to automatically authenticate a computing device of the user so that the computing device can gain access to a private network.

When a computing device attempts to connect to a private network, that private network sends an authentication request 250 to authentication server. That authentication request 250 will include a first unique identifier (e.g. a first MAC address) of the computing device and a separate second unique identifier (e.g., a second MAC address) of the private network. Authentication determiner 225 attempts to match the second unique identifier of the private network to a unique identifier associated with a network account. When a match is identified, authentication determiner 225 identifies the authentication policies that are in place for the private network.

Authentication determiner 225 additionally attempts to match the first unique identifier to a unique identifier included in a user account. If no match is found, user account manager 215 prompts a user of the computing device to create a new user account. The prompt may be sent to the computing device with a request for information 255. The request for information 255 may be, for example, a hypertext markup language (HTML) document that is served to a web browser of the computing device. The user may be prompted to provide certain user information, provide credentials for connecting to one or more social network accounts (e.g., authenticate a third party service against a user's computing device), provide identity validation information (e.g., select a PIN or password), and so on. User account manager 215 may determine what authentication criteria are specified by the authentication policies of the private network, and may prompt the user to input data sufficient to satisfy the authentication criteria.

Once a user account that is associated with the received first unique identifier is identified, authentication determiner 225 may prompt a user of the computing device to provide identity validation information. For example, the user may be prompted to input a PIN or password, to speak a password, to provide a fingerprint or retinal scan, and so forth. Upon receipt of the identity validation information, authentication determiner 225 compares the received identity validation information to stored identity validation information associated with the user account. If these values match, then the user is verified as being the present user of the computing device. In some instances, multiple user accounts may include the same unique identifier (e.g., if a single computing device has multiple users). In such an instance, the received identity validation information would be compared against the stored identity validation information for both user accounts. Once a match to a user account is identified, that user account is tied to the computing device for a current session.

If a user account that is associated with the received first unique identifier is identified (and possibly verified using provided identity validation information), authentication determiner 225 checks whether information included in the user account satisfies the authentication criteria of the private network. If the information does not satisfy the authentication criteria, then authentication determiner 225 may prompt the user of the computing device to provide additional information or take an action. For example, if a private network requires a social network account for a particular social network service, then the user may be prompted to provide credentials for accessing a social network account of that social network service. If the private network requires a particular relationship to a social network account associated with the private network, then the user may be prompted to, for example, become friends or like the social network account associated with the private network.

If the user account includes information that satisfies the authentication criteria of the private network, authentication determiner 225 sends an authentication response 260 to the private network notifying the private network that the computing device is authenticated. If the user account does not include such information (and was unable to remedy the deficiency), then authentication determiner 225 sends an authentication response 260 to the private network notifying the private network that the computing device is not authenticated.

In traditional systems, businesses that provide access to their private network are unable to determine the identities of those individuals who are accessing their network. One advantage provided by the authenticate server 205 is that it can identify distinct individuals who are accessing a private network. In one embodiment, network user reporter 235 sends reports to an entity associated with the private network (e.g., to a business that provides the private network) that provides detailed information about the identities of users who accessed their private network. Such a report may identify users by name, gender, age, profession, etc. Additionally, such a report may identify the amount of time that each user was on the private network, the activities that they performed, the bandwidth that they used, and so on. Such information can be valuable to a business. Network usage reporter 235 may also provide a dashboard with network usage information. The dashboard may be accessible to users that log into authentication server 205 with appropriate credentials.

In addition to network usage reporter 235 reporting on the users of a private network, marketing module 240 may take specific marketing actions with respect to those users. Marketing module 240 may apply marketing actions such as sending coupons or other marketing messages 265 to a user's computing device based on marketing policies of a network account. A marketing message may be sent to a particular computing device that is being used on a private network, or may be sent to another computing device of a user. A marketing message may be sent as a web page, an email message to an email address associated with a user account, a simple message service (SMS) message to a phone number associated with a user account, a notification or post on a social network account bonded to the user account, and so on.

Figure 3:
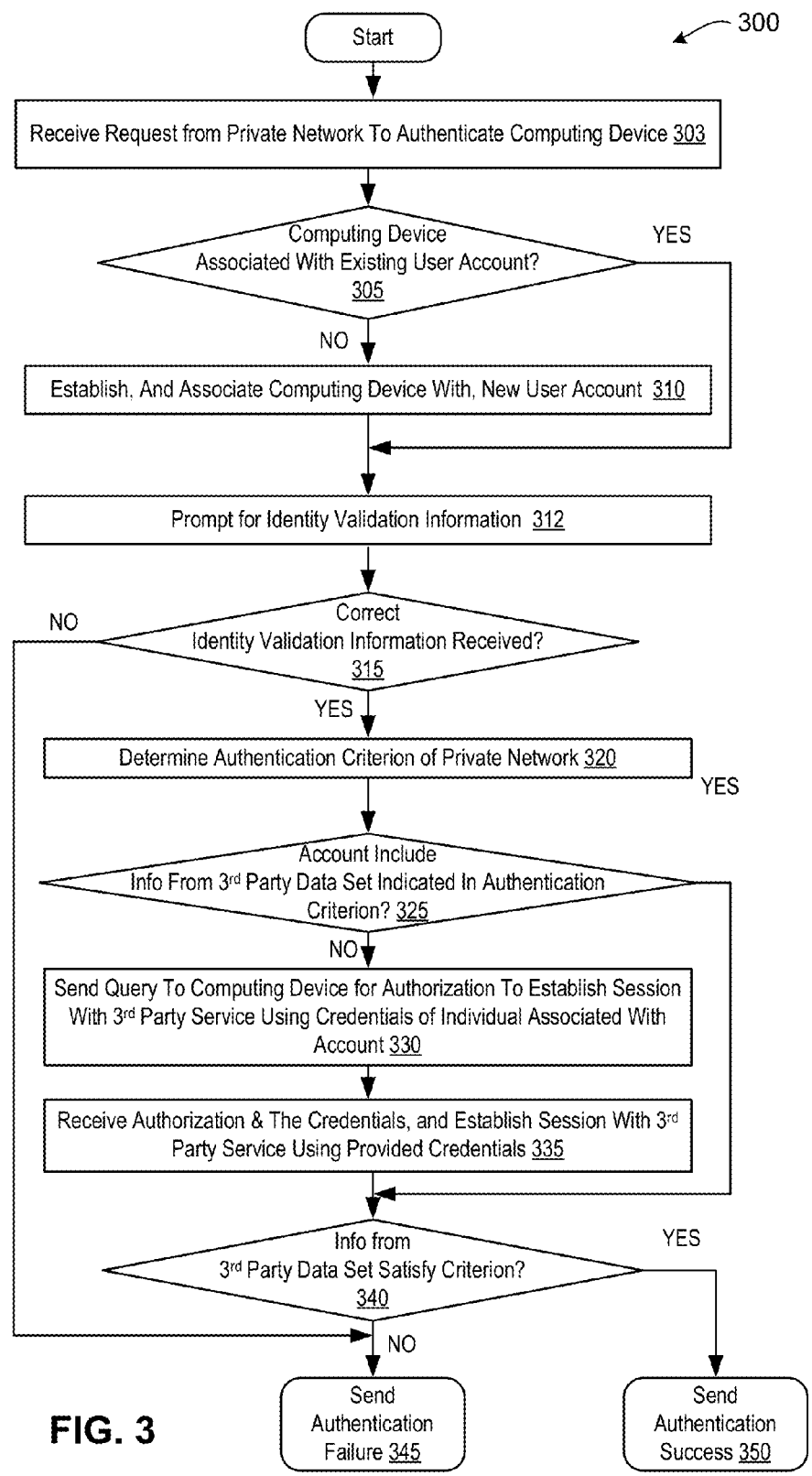
FIG. 3 is a flow diagram of one embodiment for a method of providing an authentication service to a private network.
Figure 4:
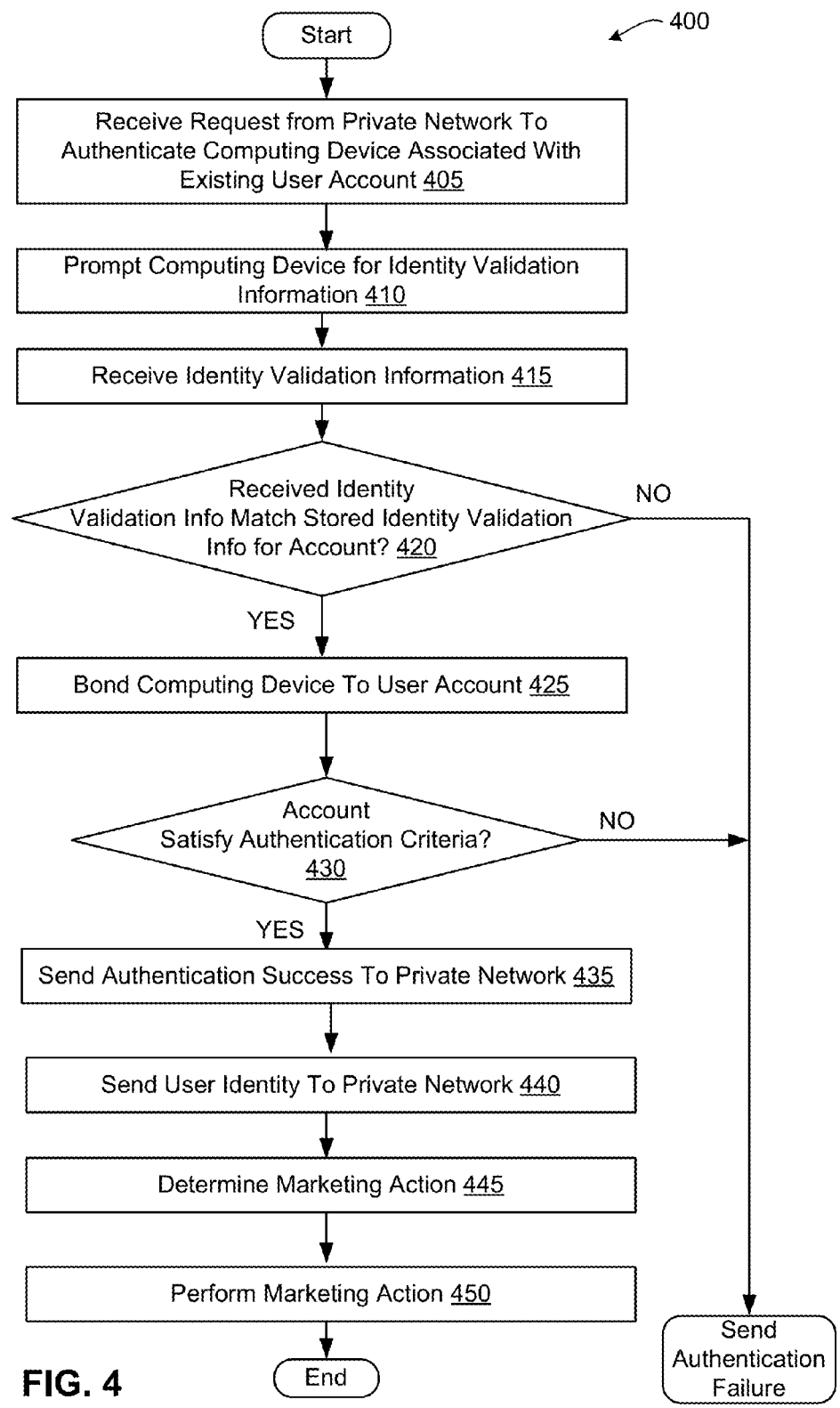
FIG. 4 is a flow diagram of another embodiment for a method of providing an authentication service to a private network.
Figure 5:
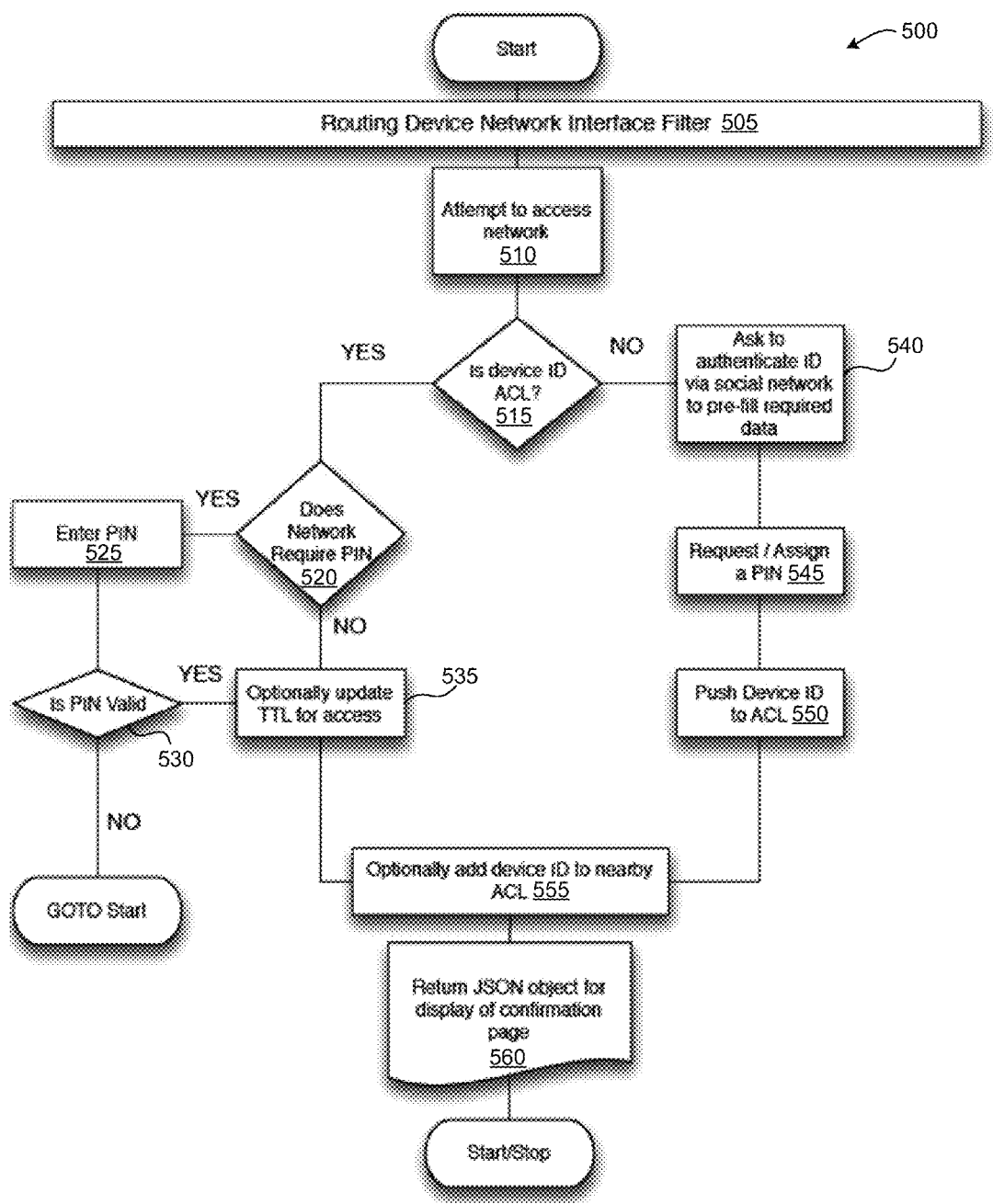
FIG. 5 is a flow diagram of yet another embodiment for a method of providing an authentication service to a private network.

FIGS. 3-5 are flow diagrams of various implementations of methods related to providing an authentication service to private networks. The methods are performed by processing logic that may include hardware (circuitry, dedicated logic, etc.), software (such as is run on a general purpose computer system or a dedicated machine), or a combination of both. In one implementation, the methods are performed by authentication server 205 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 3 is a flow diagram of one embodiment for a method 300 of providing an authentication service to a private network. At block 303 of method 300, processing logic receives a request from a private network to authenticate a computing device. The request may include a first unique identifier of the computing device and a second unique identifier of the computing device. At block 305, processing logic determines whether the computing device is associated with an existing user account. This determination is made by comparing the first unique identifier to unique identifiers of computing devices that are bonded to user accounts. If the computing device is associated with an existing user account, the method proceeds to block 312. Otherwise, the method continues to block 310.

At block 310, processing logic establishes a new user account and bonds the new user account to the unique identifier of the computing device. Processing logic may additionally prompt a user to choose a third party service that will be used to verify an online identity of the user. The choice of the third party service may be subject to an authentication policy of the private network. The user may then authenticate their chosen third party identity (e.g., by providing credentials that enable processing logic to establish a session with the third party service). Once successfully logged in and verified with the chosen third party service, the user may be prompted to choose a PIN or supply other identity validation information for the user account. Once a new user account is generated, that user account will bond the computing device to the selected online identity of the user.

At block 312, processing logic prompts the computing device to provide identity validation information such as a PIN or password. At block 315, processing logic receives identity validation information from the computing device. Processing logic then determines whether the received identity validation information matches stored identity validation information for a particular user account. If a match is determined, the method proceeds to block 320. Otherwise, the method proceeds to block 345.

At block 320, processing logic determines an authentication criterion of the private network based on the second unique identifier of the private network. Processing logic may search for a match between the received second unique identifier and unique identifies of network accounts. Once a match is found, processing logic reviews the authentication policies of that network account and the determines the authentication criterion therefrom.

At block 325, processing logic determines whether the user account includes information from a third party data set that is indicated in the authentication criterion. For example, if an authentication criterion specifies a Facebook account, then processing logic determines whether the user account is bonded to a Facebook account. If the account is bonded to a specified third party data set, the method continues to block 340. Otherwise, the method proceeds to block 330.

At block 330, processing logic sends a query to the computing device for authorization to establish a session with a third party service (e.g., with a social network service) using credential of the individual associated with the user account. At block 335, processing logic receive the requested authorization and credentials, and establishes a session with the third party service using the provided credentials. Establishment of such a session will bond a particular online identity of the individual to the user account, and thus to the computing device.

In one embodiment, the computing device may lack a user interface sufficient to display messages from processing logic. For example, the computing device may be an internet of things (IoT) device that includes a Wi-Fi module. In such an embodiment, processing logic may send the query to an alternative computing device associated with the user account. For example, a message may be sent to a mobile phone of the user. The user may provide the requested information or perform the requested action from the other computing device. Alternatively, a message may be sent to the other computing device or to another endpoint (e.g., an email address or social network account) of the user to provide the information or perform the action.

At block 340, processing logic determines whether information from the third party data set satisfies the authentication criterion. For example, processing logic may determine whether an online identity of the user (the third party data set) has a specified social graph relationship to an online identity of a business that provides the private network. This information may be determined by accessing profile information of the online identity, which may be performed before or responsive to the access request. If the information from the third party data set satisfies the authentication criterion, the method proceeds to block 350, and an authentication success message is sent to the private network. Otherwise the method continues to block 345, and an authentication failure message is sent to the private network. If at block 345 an authentication failure was sent, a separate message may also be sent to one or more destination associated with the user account identifying what actions should be performed to ensure that in the future the computing device will be granted access to the private network.

FIG. 4 is a flow diagram of another embodiment for a method 400 of providing an authentication service to a private network. At block 405 of method 400, processing logic receives a request from a private network to authenticate a computing device associated with an existing user account. At block 410, processing logic prompts the computing device for identity validation information. In one embodiment, the computing device is redirected to a captive portal window that includes the prompt for the identity validation information.

At block 415, processing logic receives the identity validation information. The identity validation information may be, for example, a PIN associated with the existing user account. At block 420, processing logic determines whether the received identity validation information matches stored identity validation information for the user account. If a match is found, the method continues to block 425, and processing logic bonds the computing device to the user account. Otherwise the method ends and an authentication failure message is sent to the private network.

At block 430, processing logic determines whether the user account satisfies authentication criteria of the private network. In one embodiment, processing logic determines whether an online identity bonded to the user account includes profile information that satisfies the authentication criteria. If the account does not include information that satisfies the authentication criteria, the method ends, and an authentication failure message is sent to the private network. If the account does include information that satisfies the authentication criteria, the method continues to block 435.

At block 435, processing logic sends an authentication success message to the private network. The computing device is then permitted by the private network to access an external network such as the Internet.

Once the computing device successfully verifies with processing logic, processing logic may perform accurate accounting via interfacing with routers and network management layers, known networks, updated data from the online identity, served calls to action, accepted calls to action, on network actions by the user, and so forth. At block 440, processing logic sends a user identity associated with the user account to the private network or to another endpoint affiliated with a provider of the private network. The user identity may include the online identity that is bonded to the user account. Processing logic may additionally send the other gathered information about the user.

At block 445, processing logic determines a marketing action to perform with respect to a user of the computing device. At block 450, processing logic performs the marketing action. Examples of marketing actions include sending a text or message to the computing device or to another endpoint associated with the user of the computing device, sending a coupon for goods and services related to a location of the private network, performing a call to action, sending a request to transfer media, prompting the user of the computing device to look at a specific item, sending an advertisement to the computing device, sending a survey or questionnaire to the computing device, initiating a checkout process on the computing device, and so forth. Processing logic may perform the marketing action by matching marketing policies of the private network to available actions. Action targeting may be based on online identity factors obtained from the profile information of the user's online identities. Action targeting may also be based on frequency of use of the private network, frequency of use of other network locations, attributes added to the user account by the private network (e.g., from a customer relationship management (CRM) system), and so on.

As mentioned, marketing actions may include the delivery of messages to the computing device, the posting of information to a social network account of a user, sending of emails to the user, sending of text messages to a phone of the user, and so forth. For messages sent to the computing device, such messages may be presented to the user through a mechanism that was used by the computing device to attempt to access the private network. On some devices, the network access attempt may have been through a web browser. In such an instance, a message may be delivered as an HTML document (e.g., web page) delivered to the web browser. In some implementations, if the device automatically attempted to roam onto the private network without user interaction, processing logic may cause a web browser to launch on the computing device. On some computing devices, a notification may be sent to the user via an operating system level message.

FIG. 5 is a flow diagram of yet another embodiment for a method 500 of providing an authentication service to a private network. At block 505 of method 500, a routing device network interface filter is activated. At block 510, a computing device attempts to access a network (e.g., a Wi-Fi network). This triggers an authentication request that is sent to an authentication server. At block 515, the authentication server determines whether a device identifier (e.g., MAC address) of the computing device is on an access control list (ACL). For example, the authentication server may determine whether the device ID is associated with an existing user account. If the device is on an ACL, the method continues to block 520. Otherwise, the method continues to block 540.

At block 520, the authentication server determines whether the network requires a PIN or other identity validation information. If the network does require a PIN, the method continues to block 525, and a PIN is provided by the computing device, after which the method continues to block 530. Otherwise, the method continues to block 535.

A block 530, the authentication server determines whether the PIN is valid. If the PIN is valid, the method continues to block 535. Otherwise, the method starts over.

At block 535, processing logic may update a time to live (TTL) value for the computing device. The method then continues to block 555.

At block 540, the authentication server generates a new account and asks a user to authenticate the device ID to the user account via a social network account. For example, a user may be asked to provide credentials to enable the authentication service to log into a social network account of the user. Once a session is established between the authentication service and the social network service for the social network account, profile information from the social network account may be used to pre-fill data required for access to the private network.

At block 545, the authentication server may request or assign a PIN or other identity validation information to the new account. At block 550, the device ID for the computing device is pushed to an access control list (ACL) for the private network. The method then continues to block 555.

At block 555, the authentication server optionally adds the device ID for the computing device to an access control list for the private network. At block 560, the authentication server returns a JSON object or other object for display of a confirmation page, which may be presented on the computing device. The computing device then has access to the private network.

Figure 6:
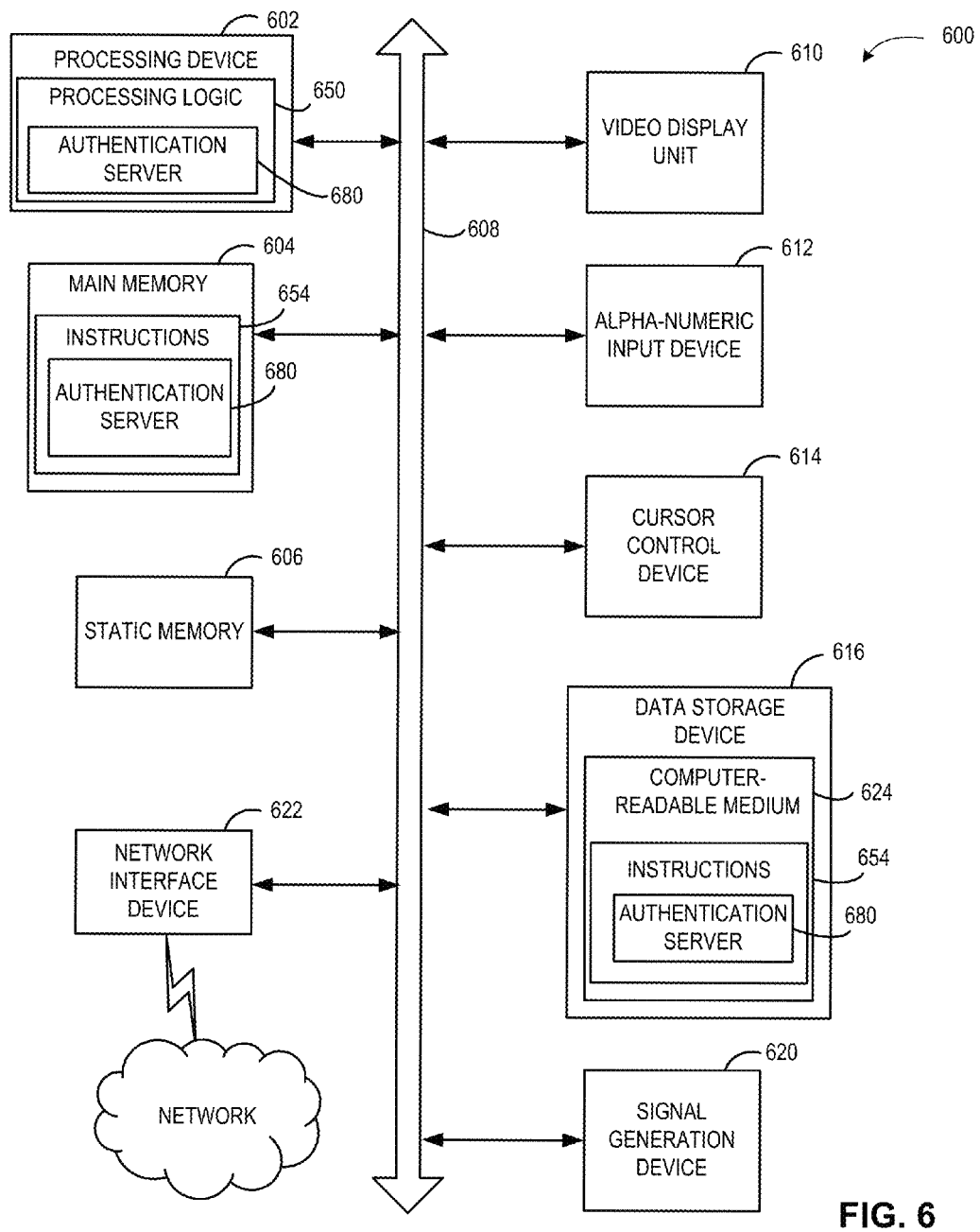
FIG. 6 is a block diagram of an example computing device, which may perform operations in accordance with embodiments of the present invention.

FIG. 6 is a block diagram of an example computing device 600, which may perform operations in accordance with embodiments of the present invention. A set of instructions for causing the computing device 600 to perform any one or more of the methodologies discussed herein may be executed by the computing device 600. The computing device 600 may correspond to a computing device of authentication server system 140 of FIG. 1.

In embodiments of the present invention, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "computing device" shall also be taken to include any collection of machines (e.g., computers) that individually or jointly execute a set (or multiple sets) of instructions to perform any one or more of the methodologies discussed herein.

The exemplary computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 616, which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computing device 600 may further include one or more network interface device 622. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions 654 embodying any one or more of the methodologies or functions described herein (e.g., for an authentication server 205). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the computing device that cause the computing device to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "notifying", "sending", "receiving", "determining", "reporting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by an authentication service running on a processing device, a request from a private network to authenticate a computing device that has attempted to access the private network, the request comprising a first identifier (ID) that uniquely identifies the computing device and a second ID that uniquely identifies the private network;
   determining, by the authentication service and based on the first ID, whether the computing device is associated with an account of the authentication service;
   determining, by the authentication service and based on the second ID, an authentication criterion for the private network, wherein the authentication criterion is associated with social network information of a third party social network service that is separate from the authentication service;
   responsive to determining that the computing device is associated with an account of the authentication service, determining, by the authentication service, whether the account comprises social network information from the third party social network service that satisfies the authentication criterion for the private network, wherein determining whether the account comprises the social network information that satisfies the authentication criterion comprises:
      establishing a session between the authentication service and the third party social network service; and
      receiving the social network information from the third party social network service via the session, wherein the social network information comprises data associated with a first social network account on the social network service, wherein the private network is associated with a second social network account on the social network service, and wherein the authentication criterion comprises a particular relationship between the first social network account and the second social network account; and
   responsive to determining that the account comprises the social network information from the third party social network service that satisfies the authentication criterion, notifying the private network that the computing device is authenticated.

2. The method of claim 1, further comprising:
   responsive to determining that the account does not comprise social network information from the third party social network service, sending a query to at least one of the computing device or an additional computing device associated with the account requesting authorization for the authentication service to establish the session with the third party social network service using credentials of an individual associated with the account.

3. The method of claim 2, further comprising:
   maintaining the session between the authentication service and the third party social network service after a connection to the computing device is terminated; and
   receiving status updates from the third party social network service.

4. The method of claim 1, further comprising:
   notifying an entity associated with the private network of an identity of a user of the computing device.

5. The method of claim 1, further comprising:
   responsive to determining that the computing device is not associated with an account, performing the following comprising:
      establishing a new account;
      associating the first identifier of the computing device with the new account; and
      prompting the computing device to provide credentials for access to a user identity maintained by the third party social network service, wherein the user identity is for a user of the computing device.

6. The method of claim 1, further comprising:
   receiving a request from a second private network to authenticate the computing device;
   determining a second authentication criterion for the second private network; and
   prompting the user to provide additional information if the account does not satisfy the second authentication criterion.

7. The method of claim 1, further comprising:
   prompting the computing device for identity validation information; and
   verifying an individual associated with the account if the provided identity validation information matches stored identity validation information, wherein the provided identity validation information comprises at least one of biometric data, a personal identification number (PIN), a password, or a gesture pattern.

8. The method of claim 1, further comprising:
   determining a marketing action to perform based on information of the user included in the account; and
   performing the marketing action.

9. The method of claim 8, wherein the marketing action comprises at least one of sending a coupon, sending a request to perform an action with respect to the second social network account associated with the private network, sending an offer to download an application, sending a request for information, or sending a request to sign up to a mailing list.

10. The method of claim 1, wherein the first ID comprises a first media access control (MAC) address of the computing device and the second ID comprises a second MAC address of a networking device on the private network.

11. The method of claim 1, further comprising:
    determining, by the authentication service and based on the second ID, a network account associated with the private network, wherein the network account comprises the private network and an additional private network, wherein the network account further comprises an additional authentication criterion associated with the additional private network, and wherein the additional authentication criterion is different from the authentication criterion.

12. The method of claim 1, wherein determining the authentication criterion for the private network comprises determining a plurality of authentication criteria for the private network, the authentication criterion being one of the plurality of authentication criteria, the method further comprising:
  determining that the account does not comprise information from the third party data set that satisfies the authentication criterion;
  determining whether the account comprises information from an additional third party data set that satisfies a second authentication criterion of the plurality of authentication criteria; and
  responsive to determining that the account comprises information from the additional third party data set that satisfies the second authentication criterion, notifying the private network that the computing device is authenticated.

13. A non-transitory computer readable storage medium comprising instructions that, when executed by a processing device, cause the processing device to perform operations comprising:
  receiving, by an authentication service running on the processing device, a request from a private network to authenticate a computing device that has attempted to access the private network, the request comprising a first identifier (ID) that uniquely identifies the computing device and a second ID that uniquely identifies the private network;
  determining, by the authentication service and based on the second ID, an authentication criterion for the private network, wherein the authentication criterion is associated with social network information of a third party social network service that is separate from the authentication service;
  determining, by the authentication service, whether the account comprises social network information from the third party social network service that satisfies the authentication criterion for the private network, wherein determining whether the account comprises the social network information that satisfies the authentication criterion comprises:
    establishing a session between the authentication service and the third party social network service; and
    receiving the social network information from the third party social network service via the session, wherein the social network information comprises data associated with a first social network account on the social network service, wherein the private network is associated with a second social network account on the social network service, and wherein the authentication criterion comprises a particular relationship between the first social network account and the second social network account; and
  responsive to determining that the social network information from the third party social network service satisfies the authentication criterion, notifying the private network that the computing device is authenticated.

14. The non-transitory computer readable storage medium of claim 13, the operations further comprising:
  determining, based on the first ID, whether the computing device is associated with an account of the authentication service.

15. The non-transitory computer readable storage medium of claim 14, the operations further comprising:
  establishing the session between the authentication service and the social network service responsive to determining that the account does not comprise the social network information from the third party social network service, wherein the session is established using credentials of an individual associated with the account.

16. The non-transitory computer readable storage medium of claim 14, the operations further comprising:
  responsive to determining that the computing device is not associated with an account, performing the following comprising:
  establishing a new account;
  associating the first ID of the computing device with the new account; and
  prompting the computing device to provide credentials for access to a user identity maintained by a third party social network service, wherein the user identity is for a user of the computing device.

17. The non-transitory computer readable storage medium of claim 14, the operations further comprising:
  determining a marketing action to perform based on information of the user included in the account; and
  performing the marketing action.

18. The non-transitory computer readable storage medium of claim 17, wherein the marketing action comprises at least one of sending a coupon, sending a request to perform an action with respect to the second social network account associated with the private network, sending an offer to download an application, sending a request for information, or sending a request to sign up to a mailing list.

19. The non-transitory computer readable storage medium of claim 14, the operations further comprising:
  receiving identity validation information from the computing device; and
  verifying an individual associated with the account if the provided identity validation information matches stored identity validation information, wherein the provided identity validation information comprises at least one of biometric data, a personal identification number (PIN), a password, or a gesture pattern.

20. The non-transitory computer readable storage medium of claim 13, further comprising:
  notifying an entity associated with the private network of an identity of a user of the computing device.

21. The non-transitory computer readable storage medium of claim 13, the operations further comprising:
  receiving a request from a second private network to authenticate the computing device;
  determining a second authentication criterion for the second private network; and
  prompting a user of the computing device to provide additional information if the account does not satisfy the second authentication criterion.

22. The non-transitory computer readable storage medium of claim 13, wherein the first ID comprises a first media access control (MAC) address of the computing device and the second ID comprises a second MAC address of a networking device on the private network.

23. A computing device comprising:
  a memory to store instructions for an authentication service; and
  a processing device, coupled to the memory, to:
    receive a request from a local area network (LAN) to authenticate a computing device that has attempted to access the LAN, the request comprising a first identifier (ID) that uniquely identifies the computing device and a second ID that uniquely identifies the LAN;
    determine, based on the first ID, whether the computing device is associated with an account of the authentication service;

determine, by the authentication service and based on the second ID, a network account associated with the private network, wherein the network account comprises the private network and an additional private network;

determine, based on the second ID, an authentication criterion for the LAN, wherein the authentication criterion is associated with social network information of a third party social network service that is separate from the authentication service, wherein the network account further comprises an additional authentication criterion associated with the additional private network, and wherein the additional authentication criterion is different from the authentication criterion;

responsive to determining that the computing device is associated with an account of the authentication service, determine whether the account comprises profile information from a social network account with a third party social network service that satisfies the authentication criterion for the LAN, wherein determining whether the account comprises the profile information that satisfies the authentication criterion comprises:

establishing a session between the authentication service and the third party social network service; and receiving the profile information from the third party social network service via the session; and responsive to determining that the account comprises profile information from the third party social network service that satisfies the authentication criterion, notifying the LAN that the computing device is authenticated.

* * * * *